United States Patent
Yamada

(10) Patent No.: US 6,956,351 B2
(45) Date of Patent: Oct. 18, 2005

(54) DRIVING DEVICE FOR STEPPING MOTOR

(75) Inventor: Yoshihisa Yamada, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/874,544

(22) Filed: Jun. 24, 2004

(65) Prior Publication Data

US 2005/0024008 A1   Feb. 3, 2005

(30) Foreign Application Priority Data

Jun. 25, 2003   (JP) .................. P.2003-181709

(51) Int. Cl.[7] .................. G01R 1/20; H02K 37/12; H02P 8/00
(52) U.S. Cl. .................. 318/685; 318/696; 116/62.1; 116/47; 116/288; 73/1.88
(58) Field of Search .................. 318/685, 696, 318/599, 603; 116/62.1, 47, 284–288, DIG. 6, 116/DIG. 35, DIG. 36; 324/139, 143, 144, 324/151 R; 702/142; 73/1.37, 1.88

(56) References Cited

U.S. PATENT DOCUMENTS

| | | | | |
|---|---|---|---|---|
| 5,032,781 A | * | 7/1991 | Kronenberg | 318/696 |
| 5,333,371 A | * | 8/1994 | Mittenbuhler et al. | 29/595 |
| 5,428,284 A | * | 6/1995 | Kaneda et al. | 318/778 |
| 5,572,105 A | * | 11/1996 | Nojima et al. | 318/696 |
| 5,900,711 A | * | 5/1999 | Senoo | 318/696 |
| 6,014,075 A | * | 1/2000 | Fujimori et al. | 340/461 |
| 6,356,046 B1 | * | 3/2002 | Koumura et al. | 318/696 |
| 6,519,999 B2 | * | 2/2003 | Komura et al. | 73/1.88 |
| 6,624,608 B2 | * | 9/2003 | Komura | 318/685 |
| 6,771,038 B2 | * | 8/2004 | Fyfe | 318/685 |
| 6,798,164 B2 | * | 9/2004 | Umehara et al. | 318/685 |

* cited by examiner

Primary Examiner—Marlon T. Fletcher
Assistant Examiner—Eduardo Colon Santana
(74) Attorney, Agent, or Firm—Sughrue Mion, PLLC

(57) ABSTRACT

A driving device, includes a stepping motor having an exciting coil and a rotor; a driven member driven in accordance with a rotation of the rotor; a stopper mechanically stopping the driven member at a zero position; a controller controlling the state of excitation of the exciting coil; an induced voltage detector detecting an induced voltage generated by a change of magnetic flux according to the rotation of the rotor; and a zero position detector detecting a stoppage of the driven member at the zero position. The controller supplies an exciting pattern to the exciting coil at the time of processing of zero position detection. The exciting pattern includes a first exciting step for detecting the induced voltage and a second exciting step for rotation. Total periods of the first exciting step is greater than that of the second exciting step during an electrical angle 90° in the one cycle.

4 Claims, 15 Drawing Sheets

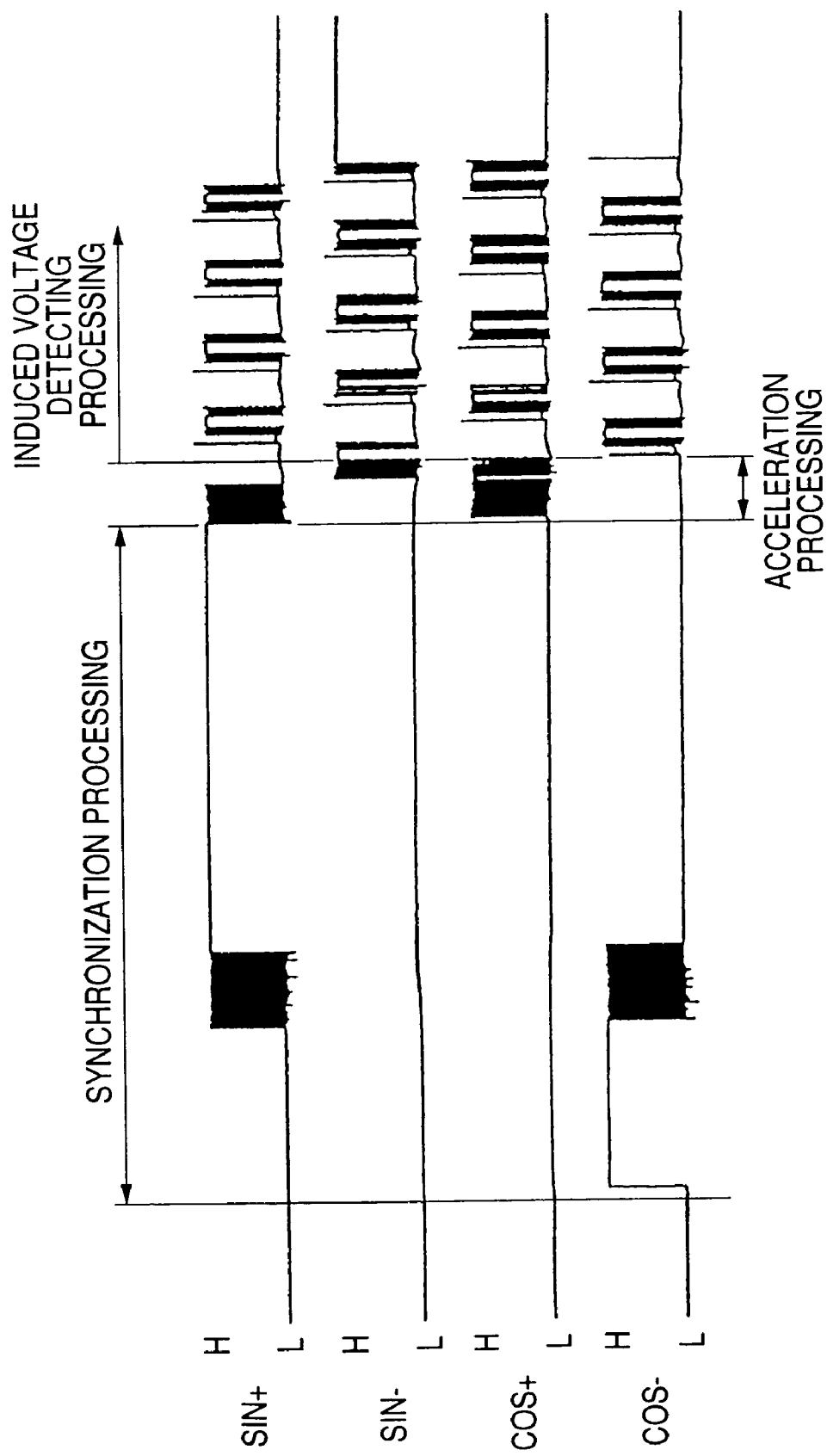

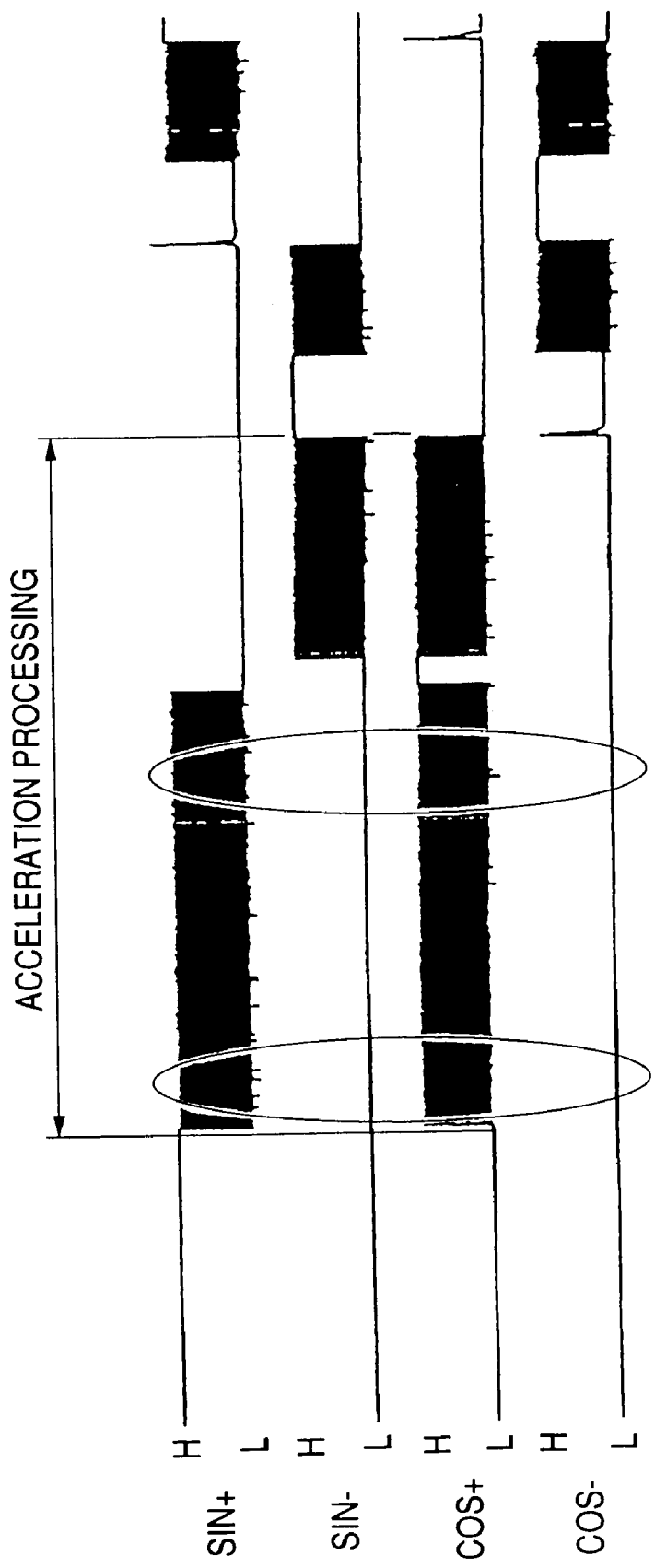

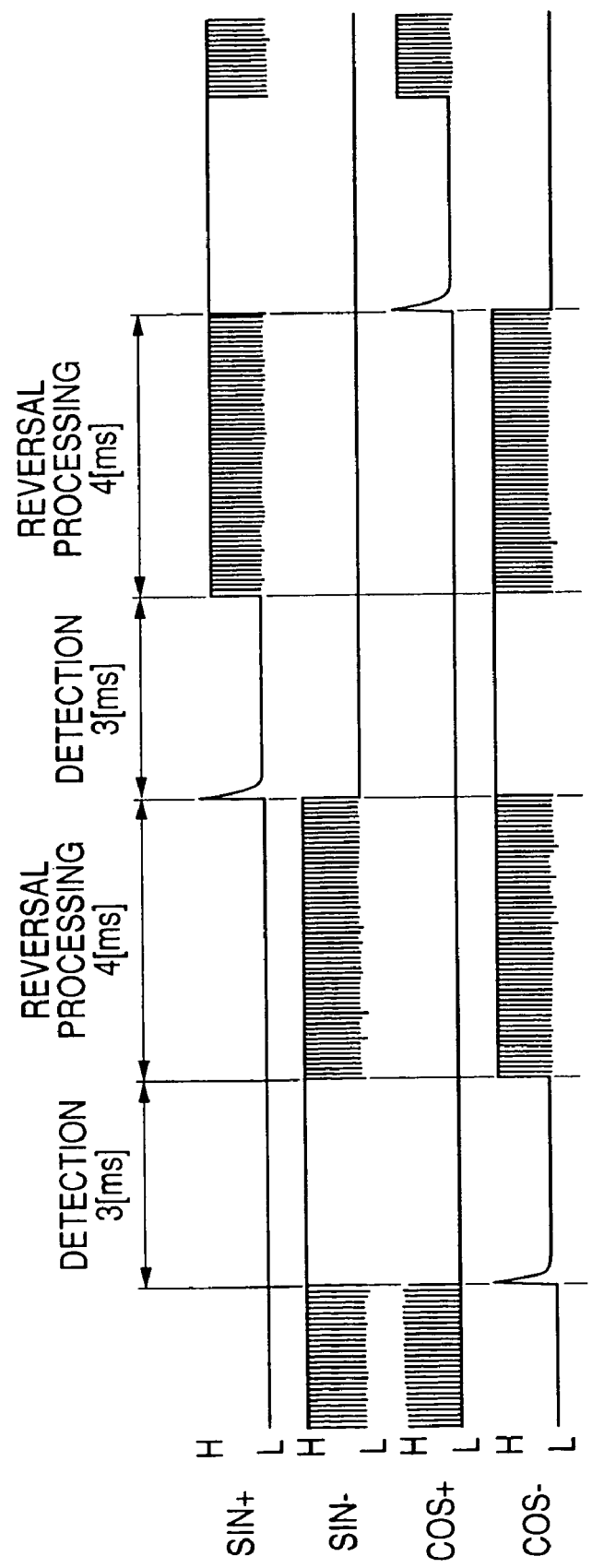

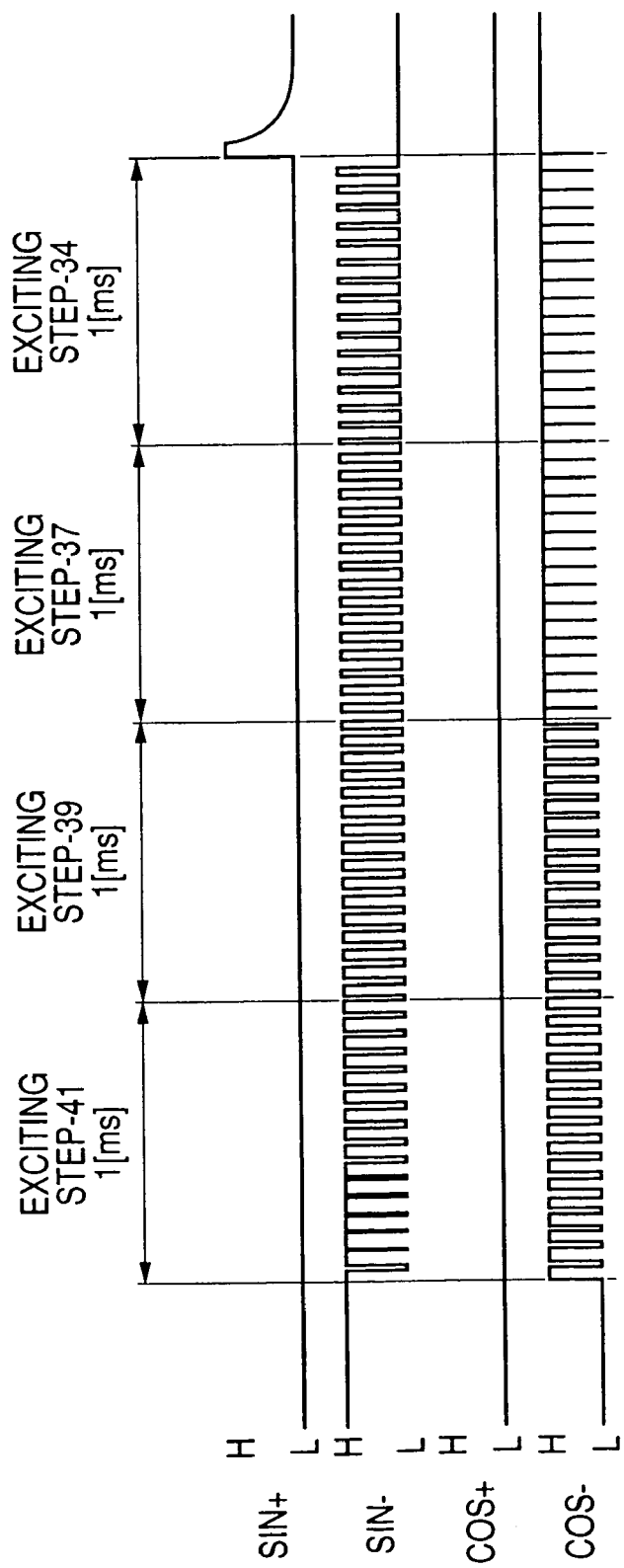

DRIVING DEVICE FOR STEPPING MOTOR

BACKGROUND OF THE INVENTION

The present invention relates to a driving device for a stepping motor. More particularly, the present invention relates to a driving device for a stepping motor, which is used for a meter mounted on a vehicle, the initialization processing of which is improved.

Recently, stepping motors have been frequently used for speedometers to display a vehicle speed or for tachometers to display a rotating speed of an engine for the reasons of improving the indicating accuracy and reducing the manufacturing cost.

However, in a vehicle on which a meter having the above stepping motor is mounted, by an erroneous signal generated by vibration or noise of the vehicle, an actual moving distance of an indicating needle of the meter, which is linked with the rotation of the stepping motor, becomes different from an original moving distance of the indicating needle of the meter.

Therefore, in the case of the meter mounted on a vehicle in which this stepping motor is used, the following initialization processing is conducted. For example, at the time when the ignition switch has been turned on, the stepping motor is reversed in the direction of the stopper, and the indicating needle is returned to the zero position determined by the stopper.

In this initialization processing, in order to detect whether or not the indicating needle, the position of which is controlled by the stepping motor, comes into contact with the stopper by which the zero position of the indicating needle is determined, an induced voltage generated by the rotation of the rotor of the stepper motor is detected, and when the thus detected induced voltage becomes not more than a predetermined threshold value, the zero position detecting processing is conducted in which the indicating needle has collided with the stopper, which is set at the zero position, and stopped.

Referring to FIGS. 14 and 15, this zero position detecting processing is explained below.

FIG. 14 is a diagram showing a relation among each excitation step in the zero position detecting processing, the zero position detecting excitation pattern, the detection timing and the induced voltage. FIG. 15 is a view showing a relation between each excitation step in FIG. 14 and the rotating pattern of the rotor. Numerals in the parentheses represent the rotary angles of the rotor. Numerals in the rectangles represent the step numbers. In this connection, in these views, it is estimated that the rotor of the stepping motor is rotated in the direction indicated by an arrow at the time of zero position detection processing. This rotor has three N-poles and S-poles which are alternately arranged and uniformly magnetized.

An exciting signal for rotating the rotor is composed of exciting pulses P1, P2, P3 and P4 in which H (high level) and L (low level) are combined. For example, H is 5 volt and L is 0 volt. Exciting pulses P1 and P2 are supplied to both end portions "a" and "b" of one exciting coil 1a1. Exciting pulses P3 and P4 are supplied to both end portions "a" and "b" of the other exciting coil 1a2.

In order to reverse the rotor so that the indicating needle, which is connected to the rotor via a gear, can be moved to the zero position determined by the stopper, one cycle of the zero position detection exciting pattern is composed of eight exciting steps 3, 2, 1, 8, 7, 6, 5 and 4 to which the same period of time is allotted, and the stepping motor is driven by the half step drive system.

The exciting signals (P1, P2, P3 and P4) in the exciting step 1 are synchronized with the corresponding rotary patterns of the rotor. When the exciting step shifts in the order of 3, 2, 1, 8, 7, 6, 5 and 4, the rotor is rotated by 15° at a time as shown in FIG. 15. For example, when the step changes from the exciting step 3 to the exciting step 2, the angle of the rotor is changed from the rotary angle 0° to 15° by the exciting signal (P1, P2, P3 and P4). The rotary angle is changed between the exciting steps by 15° at a time in the same manner. In this connection, when the step shifts from the exciting step 4 to the exciting step 3 in the next cycle, the rotary angle is changed by 15°.

The cycle composed of the above eight exciting steps is repeated until the indicating needle comes into contact with the stopper, that is, until the rotor can not rotate and the induced voltage detected by the exciting coil becomes lower than the threshold value.

The detection timing signal for detecting the zero position is set so that it can become H at the timing when the exciting coil 1a1 is not excited, that is, at the exciting steps 1 and 5 in which the exciting pulses P1 and P2 supplied to both end portions "a" and "b" of the exciting coil 1a1 become L (zero volt) and at the exciting steps 3 and 7 in which the exciting pulses P3 and P4 supplied to both end portions "a" and "b" of the exciting coil C2 become L (zero volt). In response to this detection timing signal, the induced voltage, which is detected by the exciting coils 1a1, 1a2, one end of which is connected to the ground and the other end of which is open, is compared with the threshold value (reference voltage V). When the rotor is rotated so that the indicating needle can be moved to the zero position determined by the stopper, the indicating needle comes into contact with the stopper. Then, the induced voltage theoretically becomes zero. Therefore, the induced voltage becomes lower than the threshold value, that is, the zero position detection is conducted at this point of time.

In the above zero position detection processing, the following problems may be encountered. In the zero position detection processing, the detection cycle for detecting the induced voltage is used for the half step drive system. Therefore, as shown in the vector diagram of FIG. 16, an intensity of drive torque is greatly changed between one phase exciting step and two phase exciting step in the coil A-phase (the exciting coil 1a1) and the coil B-phase (the exciting coil 1a2). Therefore, the drive torque is not constant. Further, since the rotating speed of the rotor is changed, the rotor can not be rotated smoothly. Therefore, as shown in FIG. 17, the detected induced voltage considerably changes. Accordingly, there is a possibility of the occurrence of erroneous detection of the zero point.

SUMMARY OF THE INVENTION

It is therefore an object of the present invention to provide a driving device of a stepping motor in which the occurrence of erroneous detection of the zero point can be prevented.

In order to achieve the above object, according to the present invention, there is provided a driving device, comprising:

a stepping motor, having an exciting coil and a rotor which rotates according to a state of excitation of the exciting coil;

a driven member, being driven in accordance with a rotation of the rotor;

a stopper, mechanically stopping the driven member at a zero position;

a controller, controlling the state of excitation of the exciting coil;

an induced voltage detector, detecting an induced voltage generated by a change of magnetic flux according to the rotation of the rotor; and a zero position detector, detecting whether or not the driven member is stopped at the zero position based on the induced voltage which is detected by the induced voltage detector, wherein the controller supplies an exciting pattern, in which an electric one cycle of the exciting pattern is composed of a plurality of exciting steps for reversing the rotor by a micro-step drive system, to the exciting coil at the time of processing of zero position detection to return the driven member to the zero position;

wherein the exciting pattern includes a first exciting step for detecting the induced voltage and a second exciting step for rotation; and wherein total periods of the first exciting step is greater than that of the second exciting step during an electrical angle 90° in the one cycle.

Preferably, the first exciting step has a first predetermined period of time. The second exiting step has a second predetermined period of time smaller than the first predetermined time.

In the above configurations, it is possible to obtain a stable induced voltage at the time of rotation in the processing of zero position detection. Accordingly, it is possible to prevent the occurrence of erroneous detection of the zero position.

Preferably, the micro-step drive system uses a micro-step of $1/n$ ($n \geq 3$).

In the above configuration, the drive torque becomes substantially constant, and further the rotary angle for each exciting step is so small that no vibration is generated. The rotor rotates smoothly, and it becomes possible to obtain a stable induced voltage at the time of rotation. Accordingly, it is possible to prevent the occurrence of erroneous detection of the zero position.

Preferably, the controller defers to detect the induced voltage for a predetermined period of time from the start at the time of processing of zero position detection.

In the above configuration, it is possible to stably obtain an induced voltage at the time of rotation.

BRIEF DESCRIPTION OF THE DRAWINGS

The above objects and advantages of the present invention will become more apparent by describing in detail preferred exemplary embodiments thereof with reference to the accompanying drawings, wherein:

FIG. 6 is a diagram showing a drive wave-form at the time of initialization processing of the stepping motor;

FIG. 7 is an enlarged view showing a drive wave-form at the time of acceleration processing in FIG. 6;

FIG. 10 is an enlarged view showing an induced voltage detection cycle (excitation by PWM drive);

FIG. 11 is a view showing an enlarged wave-form of a portion in which reversing processing is conducted in FIG. 10;

DETAILED DESCRIPTION OF THE PREFERRED EMBODIMENTS

Figure 1:
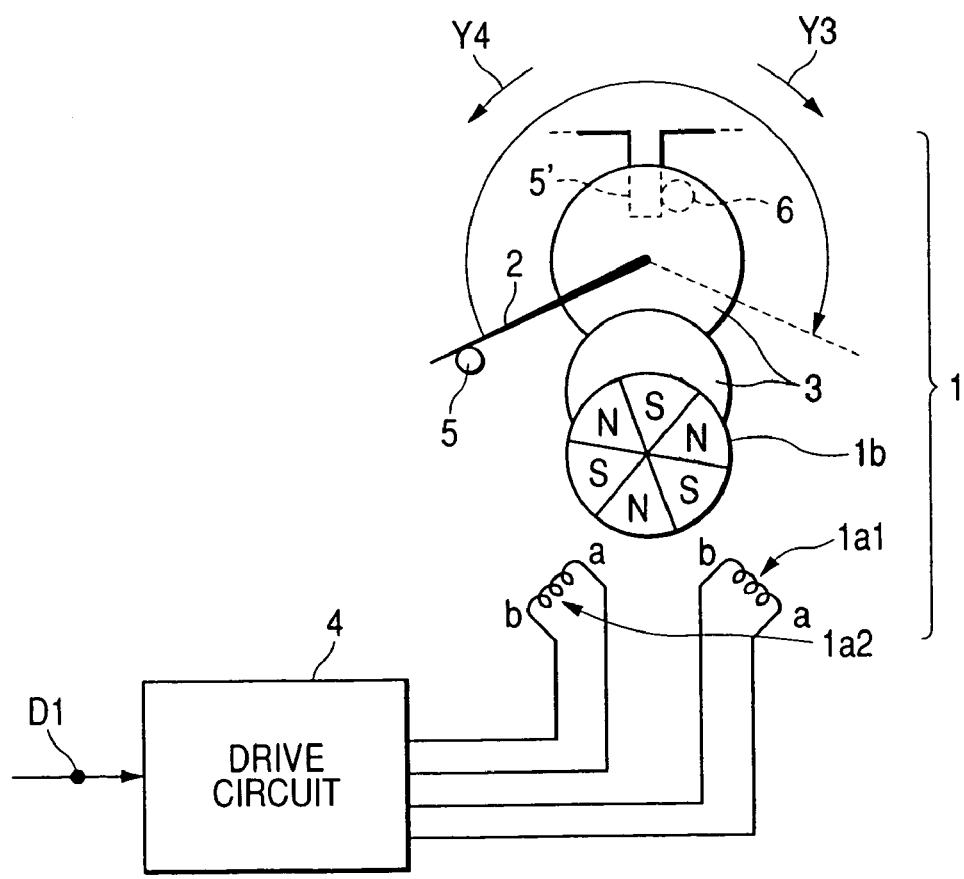
FIG. 1 is an arrangement view of the meter mounted on a vehicle to which the embodiment of the driving device of the stepping motor of the present invention is applied.

Referring to the drawings, an embodiment of the present invention will be explained below.

FIG. 1 is an arrangement view of the meter mounted on a vehicle to which the embodiment of the driving device of the stepping motor of the present invention is applied. The meter mounted on the vehicle is, for example, a speedometer. The meter mounted on the vehicle includes: a stepping motor 1 and a drive circuit 4 for controlling the drive of the stepping motor 1. The stepping motor 1 has two exciting coils 1a1, 1a2 arranged at positions making a right angle with a stator (not shown) and also has a rotor 1b in which three N-poles and S-poles are alternately magnetized. The rotor 1b is rotated in accordance with a change in the excitation of the exciting coils 1a1, 1a2.

The meter mounted on a vehicle further includes: an indicating needle 2, which is a member to be driven, engaged with the rotation of the rotor 1b; a gear 3 for transmitting the rotation of the rotor 1b to the indicating needle 2; and a stopper 5 for stopping a movement of the indicating needle 2 when the stopper 5 comes into contact with the indicating needle 2. In this connection, instead of the zero position setting which is conducted by a contact of the stopper 5 with the indicating needle 2, it is possible to adopt the zero position setting which is conducted by a contact of the stopper piece 6 with the stopper 5'. The stopper piece 6 is protruded from the gear 3 and serves as a member to be driven. The stopper 5' is differently provided at a position corresponding to the zero position.

Figure 2:
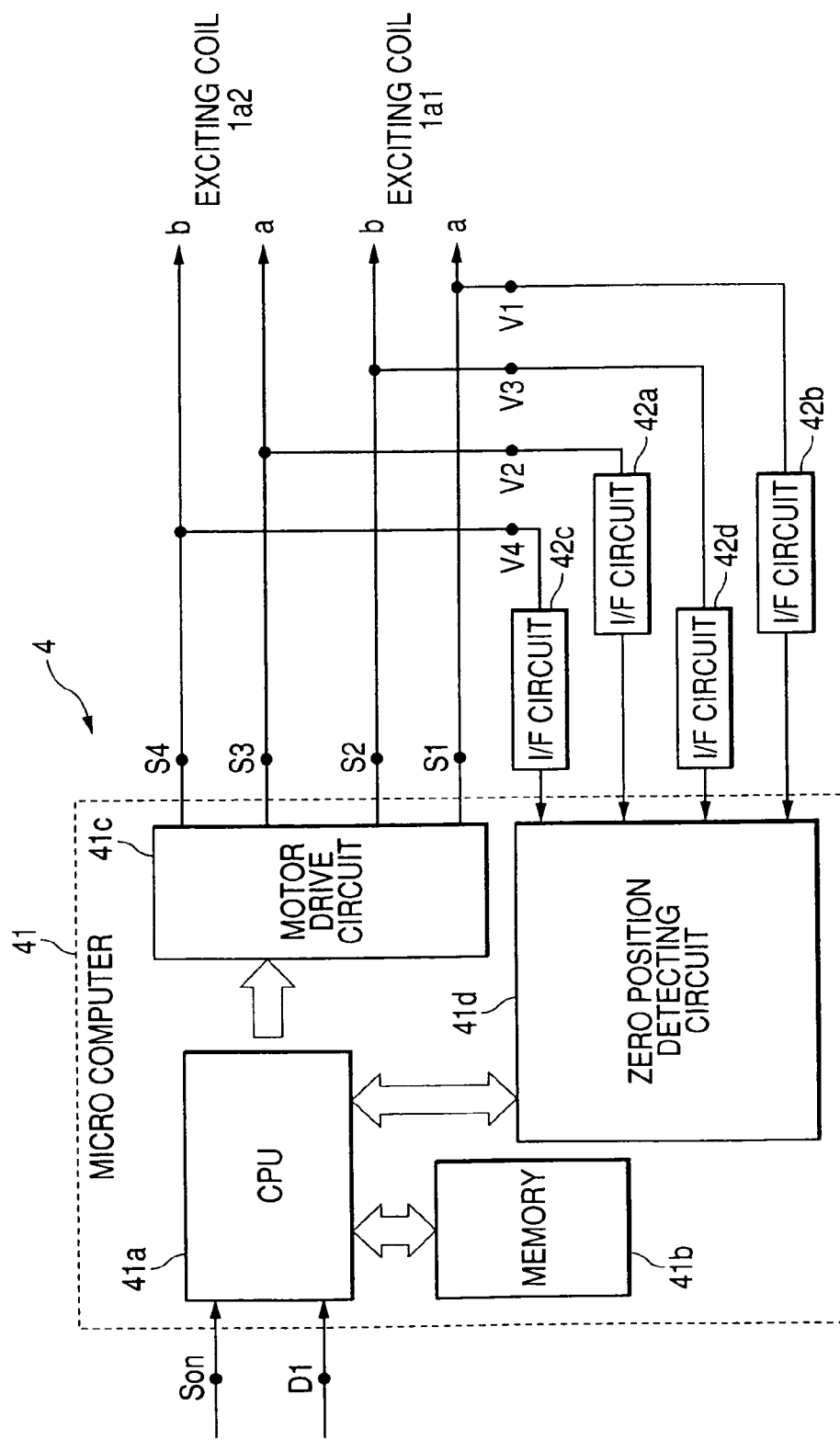
FIG. 2 is an arrangement view of the driving device of the meter mounted on a vehicle shown in FIG. 1.

As shown in FIG. 2, the drive circuit 4 includes a microcomputer 41 which serves as a controller. The microcomputer 41 includes: a central processing unit (CPU) 41a which conducts various processing according to the program; a memory 41b; a motor drive circuit 41c; and a zero position detecting circuit 41d.

CPU 41*a* is inputted with an angle data signal D1, which is calculated according to the speed information sent from a vehicle sensor (not shown), and an initialization command signal Son of level H according to the Ignition-On operation of the ignition switch (not shown). CPU 41*a* outputs the exciting signals S1, S2, S3, S4 from the motor drive circuit 41*c* to both end portions "a", "b" of the exciting coils 1*a*1, 1*a*2.

Induced voltage V1, V2, V3, V4 are inputted into the zero position detecting circuit 41*d* via I/F (interface) circuits 42*a*, 42*b*, 42*c*, 42*d* which are respectively connected to one end portion "a" or "b" of the exciting coils 1*a*1, 1*a*2, and the zero position detecting circuit 41*d* supplies a zero position judging signal to CPU 41*a*.

At the time of normal operation, CPU 41*a* controls a state of excitation of the exciting coils 1*a*1, 1*a*2 by the micro-step drive system according to the angle data signal D1. As a result, the stepping motor 1 is controlled so that the rotor 1*b* can be rotated in the normal direction (Y2) or the reverse direction (Y1) corresponding to the angle data signal D1. Further, at the time of initialization processing operation, CPU 41*a* controls a state of excitation of the exciting coils 1*a*1, 1*a*2 by the micro-step drive system according to the initialization command signal Son. As a result, the stepping motor 1 is controlled for reversing the rotor 1*b* so that the indicating needle 2 can be moved toward the stopper 5, that is, the indicating needle 2 can be moved in the direction Y1.

At the time of initialization processing operation, when the induced voltage generated at both end portions of the exciting coils 1*a*1, 1*a*2, one end of which is open so that the exciting coils are not excited, according to the detection timing signal is inputted into the zero position detecting circuit 41*d* via each I/F circuit. The inputted induced voltage becomes not higher than the threshold value, a zero position judging signal to judge that the indicating needle 2 is contacted with the stopper 5 and located at the zero position is outputted to CPU 41*a*. That is, the above exciting coils 1*a*1, 1*a*2 act as a detection element to detect the induced voltage when one end of the exciting coils 1*a*1, 1*a*2 is open.

Figure 3:
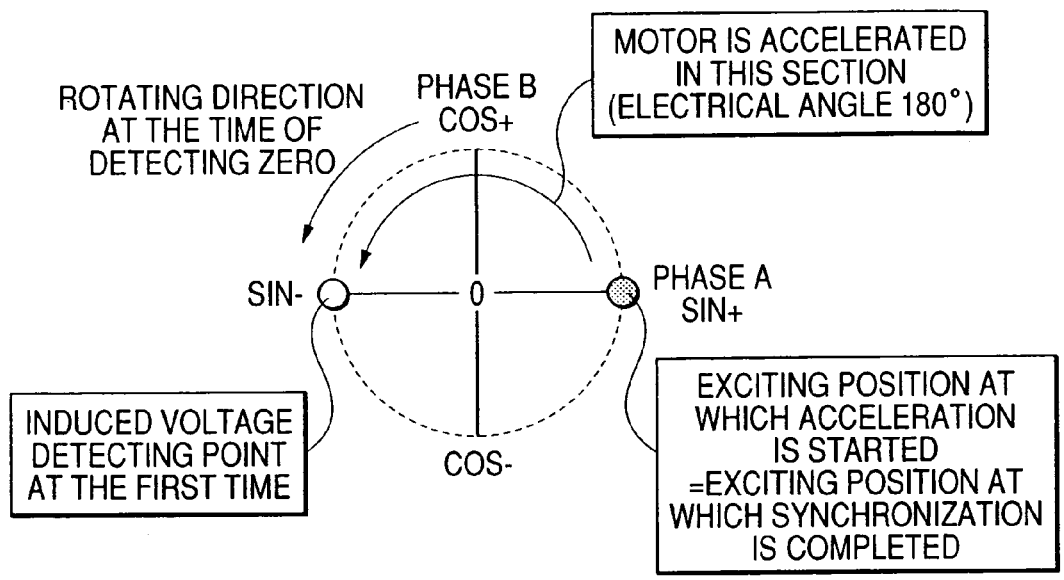
FIG. 3 is a schematic illustration for explaining an outline of operation of the driving device shown in FIG. 2.

As shown in FIG. 3, at the time of initialization processing operation, when the stepping motor 1 is reversed, the drive circuit 4 supplies the exciting pulses P1, P2, P3, P4 having an exciting pattern for accelerating the stepping motor 1 in the section from 0° to 180° in one electric cycle, so that the stepping motor 1 is accelerated from the start of the reverse rotation. After that, the zero position detecting processing is conducted.

In the zero position detection processing, the drive circuit 4 generates the exciting signals S1, S2, S3, S4 having an exciting pattern, in which one electric cycle is composed in a plurality of exciting steps in which the rotor 1*b* is reversed by the micro-step drive system. At this time, the exciting pattern includes an exciting step for detecting the induced voltage for a first predetermined period of time in the electric angle 90° in one cycle of the exciting pattern and an exciting step for rotation for a second predetermined period of time longer than the first predetermined period of time.

Figure 4:
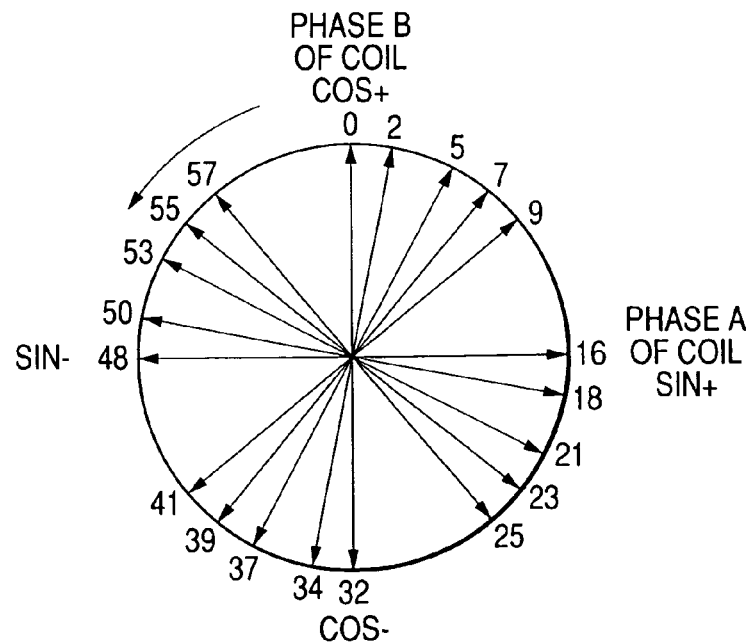
FIG. 4 is a view showing a specific embodiment of the micro-step drive system.

In this micro-step drive system, 1/n (n≧3) micro-step is used. In this embodiment, for example, as shown in FIG. 4, the micro-step for dividing one electric cycle into 64 is used, that is, one electric cycle is divided into 16 in the electric angle 90°. Seven steps in the divided 16 steps are used as a detection exciting step, and the residual 9 steps are used as an exciting step for rotation.

Specifically, in one cycle shown in FIG. 4, in the exciting step at the position of an arrow to which a numeral is attached, the exciting coils 1*a*1, 1*a*2 are excited. That is, when the exciting coil 1*a*1 corresponds to phase A(SIN+) and phase −A(SIN−) and when the exciting coil 1*a*2 corresponds to phase B (COS+) and phase −B(COS−), in the exciting step for reversing the rotor, the exciting steps for detecting the induced voltage are STEP—0, 16, 32 and 48, and the exciting steps for rotation are STEP—2, 5, 7, 9, 18, 21, 23, 25, 34, 37, 39, 41, 50, 53, 55 and 57.

The output time of the exciting pulses P1, P2, P3, P4 in each exciting step is set as follows.

In the case where the exciting step for detecting the induced voltage= STEP—0, 16, 32 and 48, the output time of the exciting pulse is 3 (ms; millisecond).

In the case where the exciting step for rotation=STEP—2, 5, 7, 9, 18, 21, 23, 25, 34, 37, 39, 41, 50, 53, 55 and 57, the output time of the exciting pulse is 1 (ms; millisecond).

In each electric angle 90° of the one cycle, a relation between the time of the exciting step for detecting the induced voltage and the time of the exciting step for rotation can be expressed by the following inequality.

Exciting step for detecting the induced voltage 3 (ms) <Exciting step for rotation 4 (ms)

Figure 5:
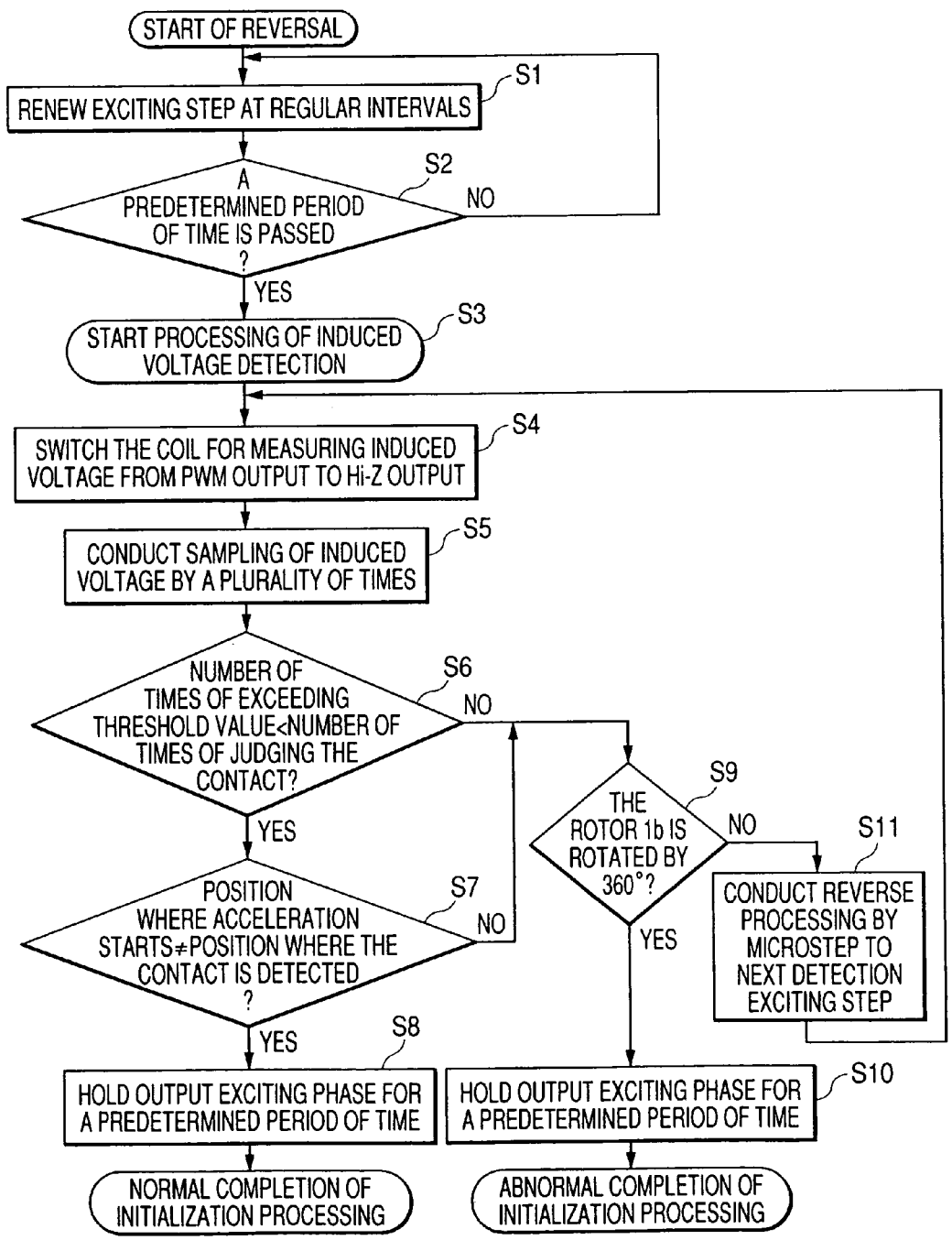
FIG. 5 is a flow chart showing a processing procedure of CPU of the driving device.

Next, referring to the flow chart of FIG. 5 showing the zero position detecting procedure of CPU 41*a*, operation of the meter mounted on a vehicle composed as described above will be explained below. First, the exciting step is renewed at a constant interval from the exciting position where synchronization has been completed (step S1). Next, it is judged whether or not a predetermined period of time has passed (step S2). Specifically, as shown in FIG. 3, it is judged whether or not a predetermined period of time has passed from the start of the zero position detection processing to when the rotor 1*b* is reversed by the electric angle 180° by the acceleration processing. When the rotor 1*b* is reversed by the electric angle 180°, it is judged that the predetermined time has passed, and then the induced voltage detection processing is started (step S3).

Next, the coil for measuring the induced voltage is changed from PWM output to Hi-Z output (high impedance output) (step S4). In this case, Hi-Z output is defined as a state in which one end portion of the exciting coil corresponding to the coil for measuring the induced voltage is open while the exciting coil is not being excited, and the induced voltage is outputted.

Next, the induced voltage, which appears in the detection exciting step from the coil for measuring the induced voltage, is subjected to sampling by a plurality of times (step S5). Next, it is judged whether or not the number of times, at which the sampled induced voltage has exceeded the threshold value, is smaller than the number of times of contact which has been previously determined (step S6).

In the case where the answer of step S6 is Yes, next, it is judged whether or not the acceleration start position is a contact detecting position (step S7). In the case where it is judged that the acceleration start position is not a contact detecting position, next, the output exciting phase is maintained for a predetermined period of time (step S8). Then, the initialization processing is normally completed.

On the other hand, in the case where the answer in step S6 is No, it is judged whether or not the rotor 1*b* has been rotated by 360° (step S9). When the answer in step S9 is Yes, the output exciting phase is maintained for a constant period of time (step S10), and the initialization processing is abnormally completed. In the case where the answer in step S9 is No, the reversing processing is executed by a micro-step to the next detection exciting step (step S11). Then, the program returns to step S4.

Figure 8A:
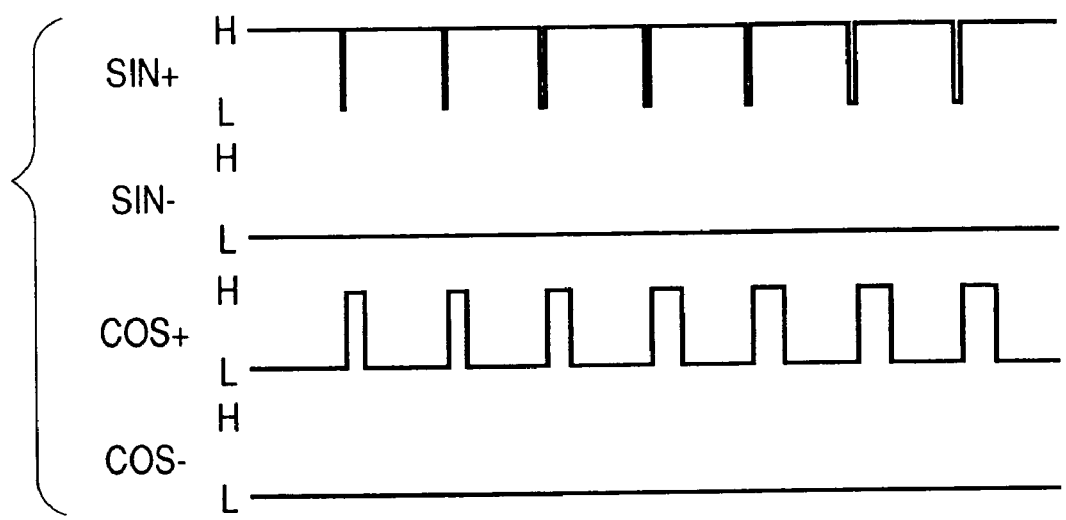
FIGS. 8A and 8B are views respectively showing a PWM output wave-form in the first half of the acceleration processing in FIG. 7 and a PWM output wave-form in the second half of the acceleration processing in FIG. 7.
Figure 8B:
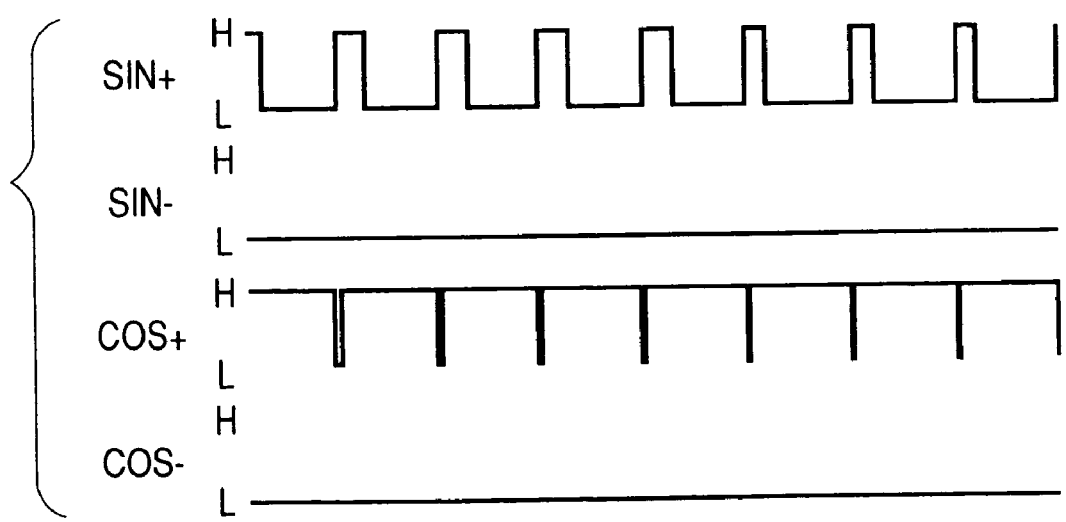
Figure 9:
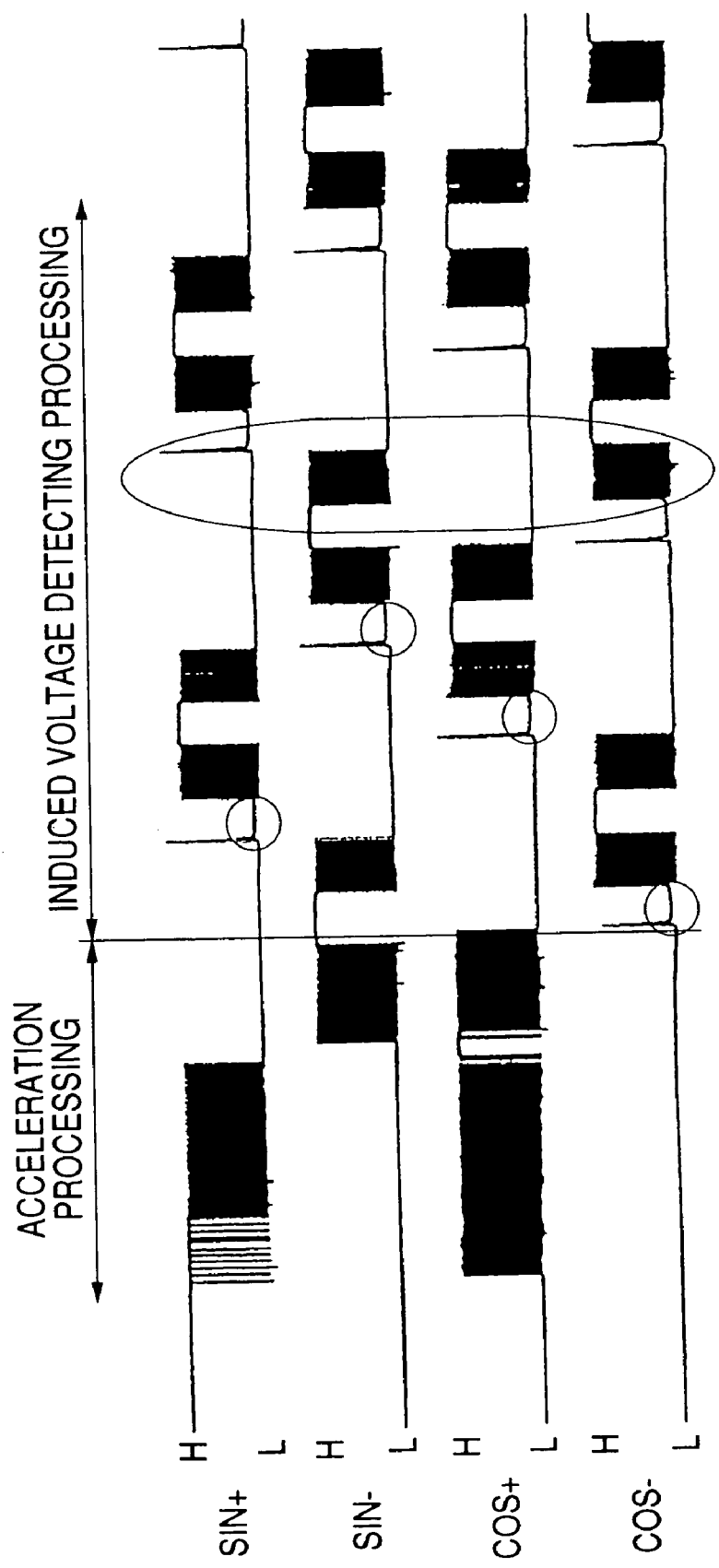
FIG. 9 is an enlarged view of the drive wave-form at the time of induced voltage detection processing; m
Figure 12A:
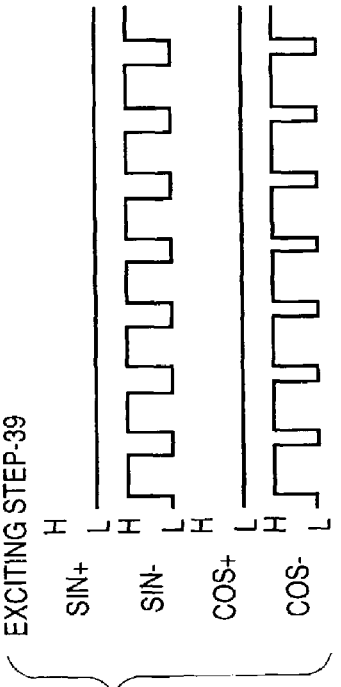
FIGS. 12A, 12B, 12C and 12D are views respectively showing an enlarged wave-form in the exciting steps for rotation 41, 39, 37, 34 in FIG. 11.
Figure 12B:
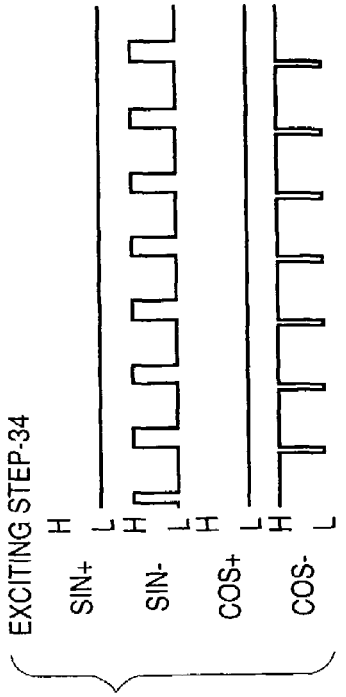
Figure 12C:
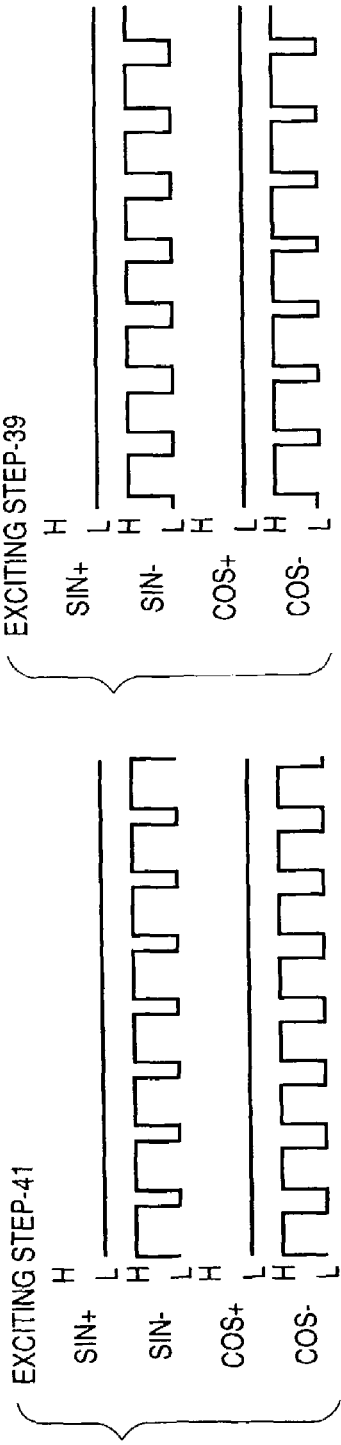
Figure 12D:
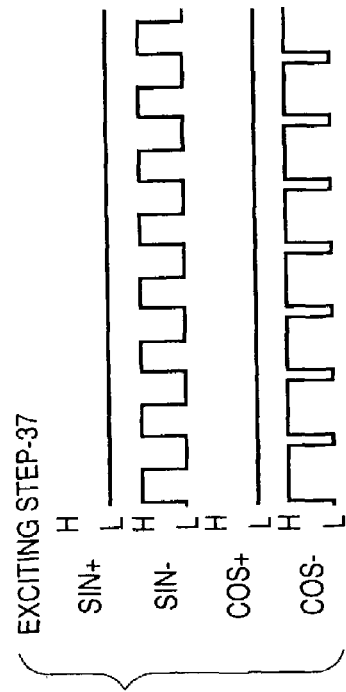

FIG. 6 is a view showing a drive wave-form at the time of initialization processing of the stepping motor. FIG. 7 is an enlarged view showing a drive wave-form at the time of acceleration processing in FIG. 6. FIGS. 8A and 8B are views respectively showing a PWM output wave-form in the first half of the acceleration processing in FIG. 7 and a PWM output wave-form in the second half of the acceleration processing in FIG. 7. FIG. 9 is an enlarged view of the drive wave-form at the time of induced voltage detection processing. FIG. 10 is an enlarged view showing an induced voltage detection cycle (excitation by PWM drive). FIG. 11 is a view showing an enlarged wave-form of a portion in which reversing processing is conducted in FIG. 10. FIGS. 12A, 12B, 12C and 12D are views respectively showing an enlarged wave-form in the exciting steps for rotation 41, 39, 37, 34 in FIG. 11.

Figure 13:
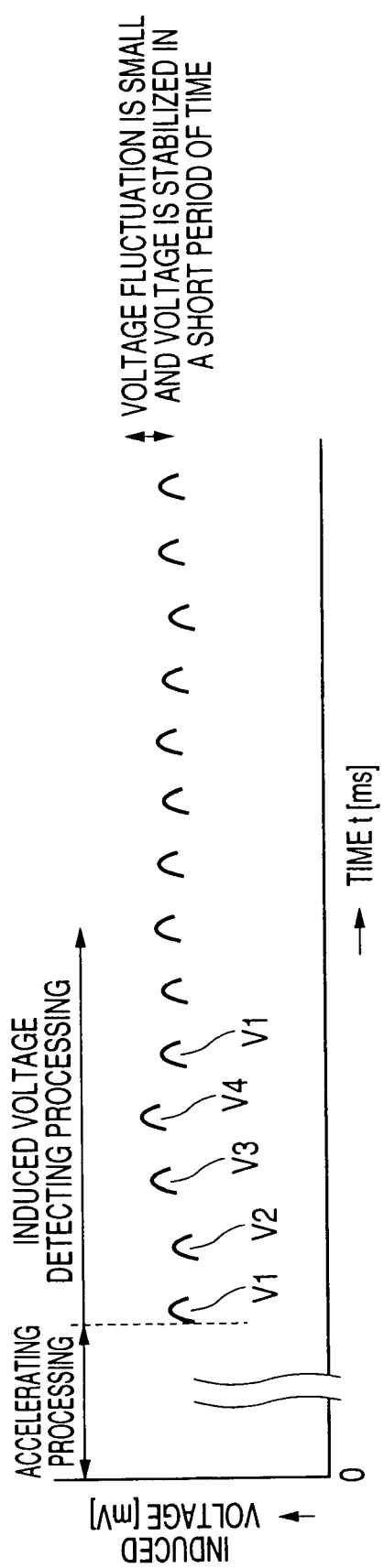
FIG. 13 is a time chart of the induced voltage detected by the position detecting circuit.
Figure 14:
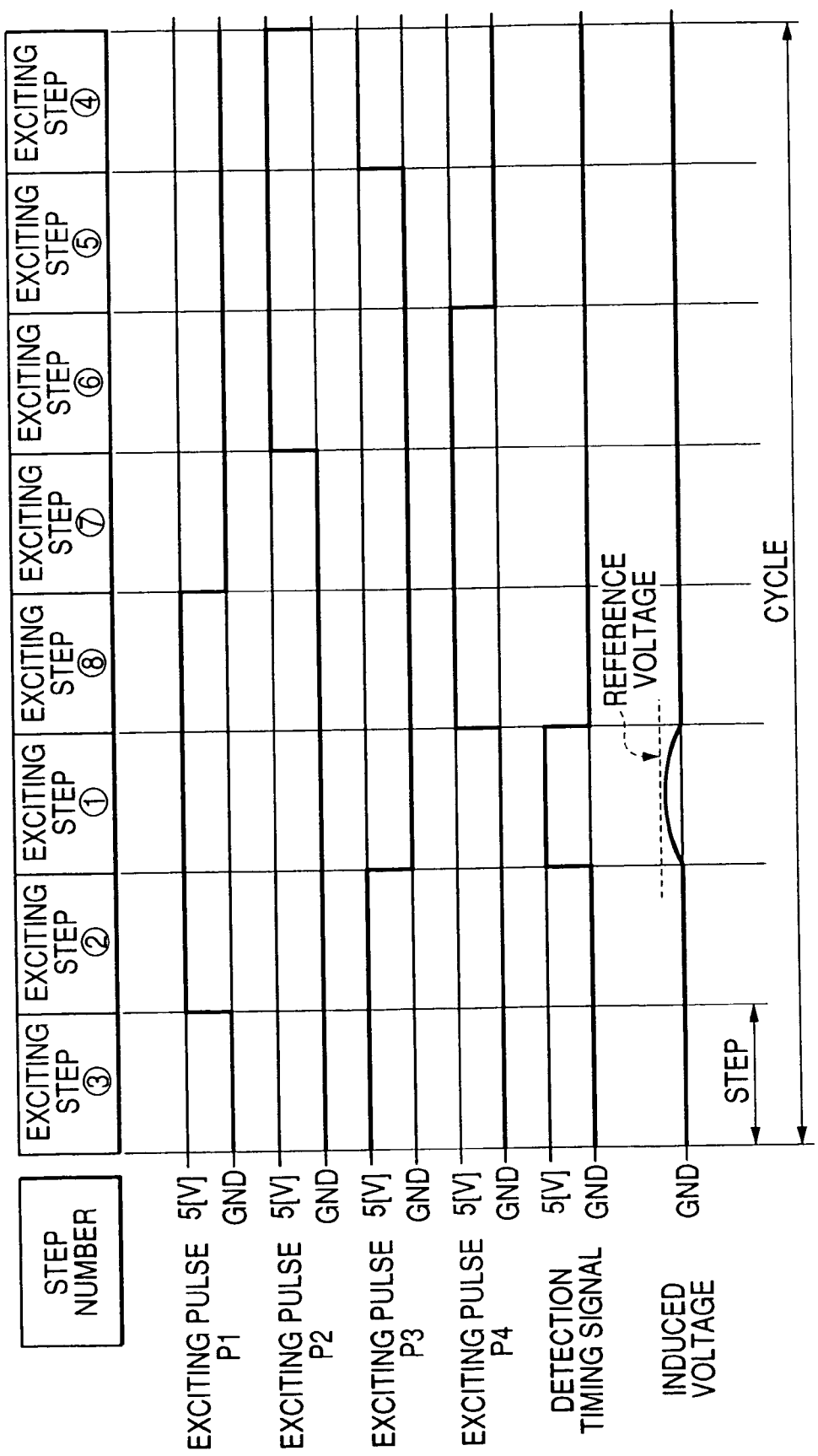
FIG. 14 is a diagram showing a relation among the excitation step in the zero position detecting processing, the zero position detecting excitation pattern, the detection timing and the induced voltage in the meter mounted on a vehicle in which the related stepping motor is used.
Figure 15:
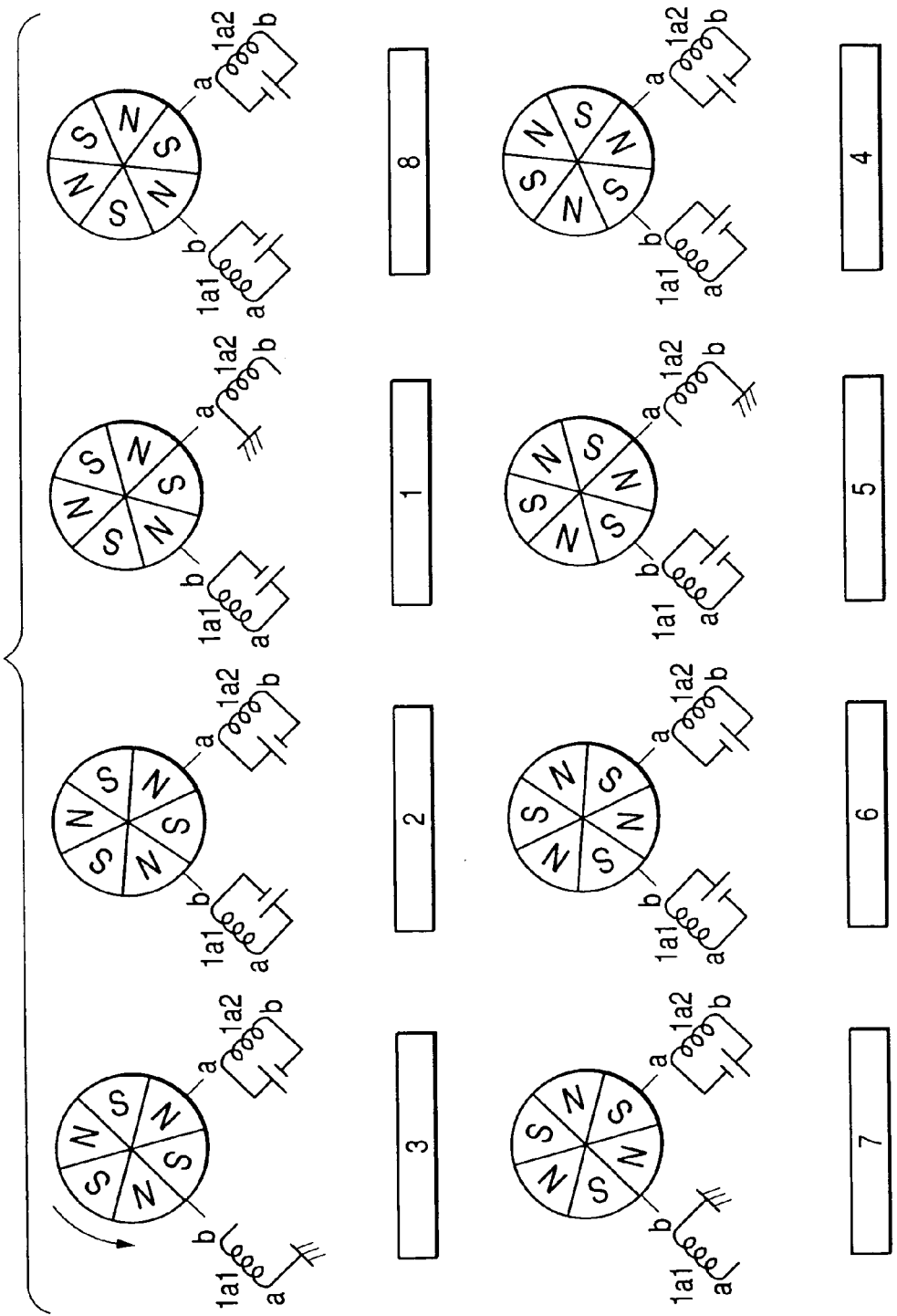
FIG. 15 is a view showing a relation between the excitation step in FIG. 14 and the rotating pattern of the rotor.
Figure 16:
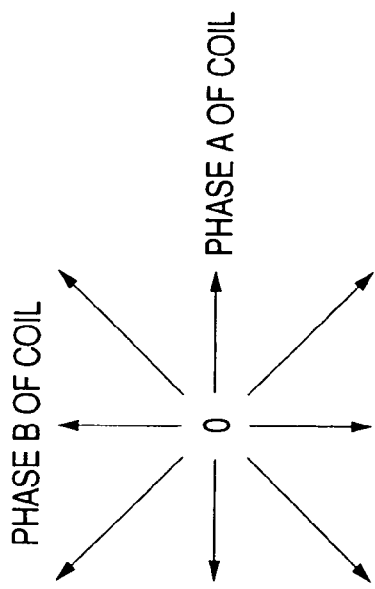
FIG. 16 is a vector diagram of the drive torque in the half step drive system.
Figure 17:
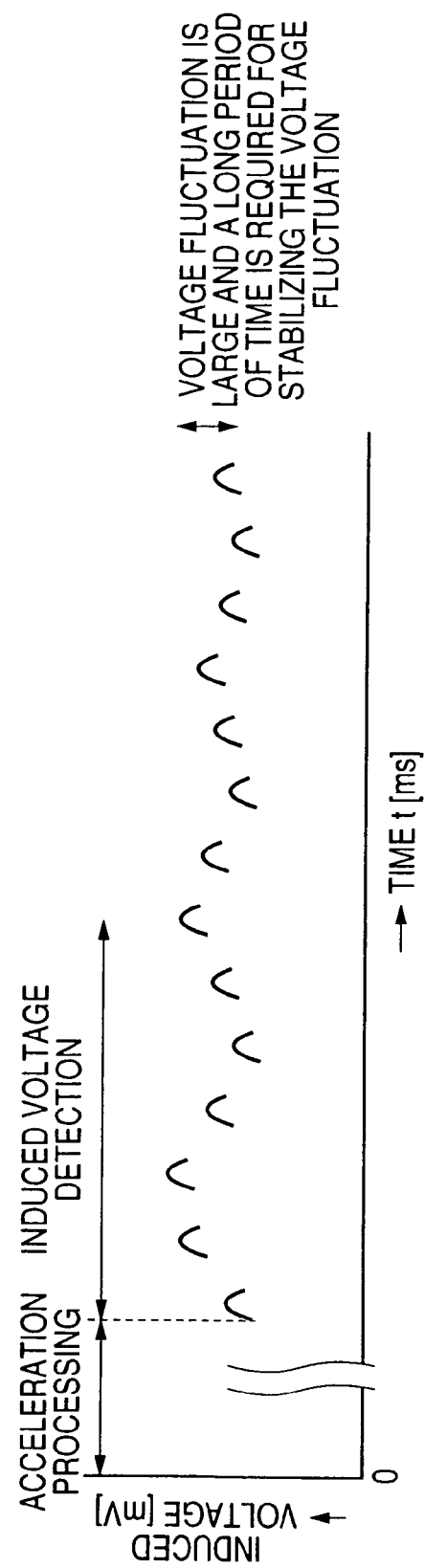
FIG. 17 is a time chart of the induced voltage detected in the zero position detecting processing in the meter mounted on a vehicle to which the related stepping motor is applied.

FIG. 13 is a time chart of the detected induced voltage. It can be seen from this time chart that the width of fluctuation of the detected induced voltage V1 to V4 is smaller than that of the related art and the period of time, in which the detected induced voltage is stabilized, is short.

As described above, when the time of the detection exciting step is set longer than the time of the exciting step for rotation, the rotating exciting time of the magnet becomes long and smooth. Therefore, it is possible to obtain a stable induced voltage at the time of rotation, and the occurrence of erroneous detection of the zero point can be prevented.

The embodiment of the present invention is explained above; however, it should be noted that the present invention is not limited to the above specific embodiment and variations may be made without departing from the scope of claim of the present invention.

What is claimed is:

1. A driving device, comprising:
    a stepping motor, having an exciting coil and a rotor which rotates according to a state of excitation of the exciting coil;
    a driven member, being driven in accordance with a rotation of the rotor;
    a stopper, mechanically stopping the driven member at a zero position;
    a controller, controlling the state of excitation of the exciting coil;
    an induced voltage detector, detecting an induced voltage generated by a change of magnetic flux according to the rotation of the rotor; and
    a zero position detector, detecting whether or not the driven member is stopped at the zero position based on the induced voltage which is detected by the induced voltage detector,
    wherein the controller supplies an exciting pattern, in which an electric one cycle of the exciting pattern is composed of a plurality of exciting steps for reversing the rotor by a micro-step drive system, to the exciting coil at the time of processing of zero position detection to return the driven member to the zero position;
    wherein the exciting pattern includes a first exciting step for detecting the induced voltage and a second exciting step for rotation; and
    wherein total periods of the first exciting step is greater than that of the second exciting step during an electrical angle 90° in the one cycle.

2. The driving device as set forth in claim 1 wherein the first exciting step has a first predetermined period of time; and
    wherein the second exiting step has a second predetermined period of time smaller than the first predetermined time.

3. The driving device as set forth in claim 1, wherein the micro-step drive system uses a micro-step of 1/n (n≧3).

4. The driving device as set forth in claim 1, wherein the controller defers to detect the induced voltage for a predetermined period of time from the start at the time of processing of zero position detection.

* * * * *